United States Patent [19]

Cruver

[11] Patent Number: 5,020,655
[45] Date of Patent: Jun. 4, 1991

[54] ARTICLE GROUP-SEGREGATING APPARATUS AND METHOD

[75] Inventor: Michael Cruver, Port Townsend, Wash.

[73] Assignee: Formost Packaging Machines, Inc., Woodinville, Wash.

[21] Appl. No.: 395,381

[22] Filed: Aug. 17, 1989

Related U.S. Application Data

[63] Continuation-in-part of Ser. No. 256,899, Oct. 13, 1988.

[51] Int. Cl.$^5$ .............................................. B65G 47/26
[52] U.S. Cl. ............................. 198/419.3; 198/419.1; 198/419.2
[58] Field of Search ............... 198/419.1, 419.3, 418.1, 198/419.2

[56] References Cited

U.S. PATENT DOCUMENTS

| | | | |
|---|---|---|---|
| 1,976,855 | 10/1934 | McKee et al. | 198/419.2 |
| 3,194,382 | 7/1965 | Nigrelli et al. | 198/418.1 |
| 3,368,660 | 2/1968 | Standley et al. | 198/419.3 |
| 3,823,813 | 7/1974 | Holt | 198/418.1 |
| 3,872,647 | 3/1975 | Langen et al. | 53/157 |
| 3,938,650 | 2/1976 | Holt | 198/419.3 |
| 4,041,677 | 8/1977 | Reid | 53/159 |
| 4,360,098 | 11/1982 | Nordstrom | 198/419 |
| 4,443,995 | 4/1984 | Myers et al. | 198/419.3 X |
| 4,630,725 | 12/1986 | Steurmer | 198/425 |

FOREIGN PATENT DOCUMENTS

| | | | |
|---|---|---|---|
| 3029508 | 3/1982 | Fed. Rep. of Germany | 198/419.3 |
| 1465356 | 1/1967 | France | 198/419.3 |
| 2052420 | 1/1981 | United Kingdom | 198/419.1 |

*Primary Examiner*—H. Grant Skaggs
*Assistant Examiner*—James R. Bidwell
*Attorney, Agent, or Firm*—Robert W. Beach; Ward Brown

[57] ABSTRACT

Article group-segregating mechanism having a plurality of article grouper members moved continuously in an orbit includes a conveyor for pushing a row of articles against an orbiting grouper member and a clamping conveyor or clamp arms for arresting movement of the row of articles behind a segregated group of articles pushed against such grouper member for enabling such group of articles to be moved out of the way followed by release of such clamping conveyor or clamp arms to enable the next group of articles to be pushed against the next orbiting grouper member.

3 Claims, 10 Drawing Sheets

ARTICLE GROUP-SEGREGATING APPARATUS AND METHOD

CROSS REFERENCE

This application is a continuation-in-part of my copending application Ser. No. 07/256,899, filed Oct. 13, 1988, pending for Article Group-Segregating Apparatus and Method.

BACKGROUND OF THE INVENTION

1. Field of the Invention

This invention relates to apparatus for segregating articles into groups from lines or rows of articles moved by a conveyor and to the method of segregating performed by such apparatus.

2. Prior Art

Nigrelli U.S. Pat. No. 3,194,382, issued July 13, 1965, shows apparatus somewhat similar to the apparatus of the present invention but has a different type of metering device for segregating groups of articles from lines or rows of articles.

Other types of apparatus for segregating groups of articles are shown in the following U.S. patents:

McKee U.S. Pat. No. 1,976,855, issued Oct. 6, 1934;
Langen U.S. Pat. No. 3,872,647, issued Mar. 25, 1975;
Reid U.S. Pat. No. 4,041,677, issued Aug. 16, 1977;
Nordstrom U.S. No. 4,360,098, issued Nov. 23, 1982;
Steurmer U.S. Pat. No. 4,630,725, issued Dec. 23, 1986.

SUMMARY OF THE INVENTION

It is an object to provide an apparatus and a method for segregating groups of articles from supply rows of articles which is adapted to segregate articles that are somewhat nonuniform and may vary in dimensions.

It is also an object to provide group-segregating apparatus which can be altered readily to segregate groups of different quantities simply by altering timing of components of the apparatus.

A further object is to provide compact and simple group-segregating apparatus.

Another object is to provide a more rapid grouping operation by utilizing continuously moving grouping mechanism instead of forming groups of stationary articles.

The foregoing objects can be accomplished by group-segregating apparatus including continuously moving overhead grouping mechanism, feed mechanism for feeding to such grouping mechanism articles to be grouped and clamping mechanism which interrupts the feed of articles to the grouping mechanism periodically without interrupting movement of the grouping mechanism.

DETAILED DESCRIPTION

Figure 1:
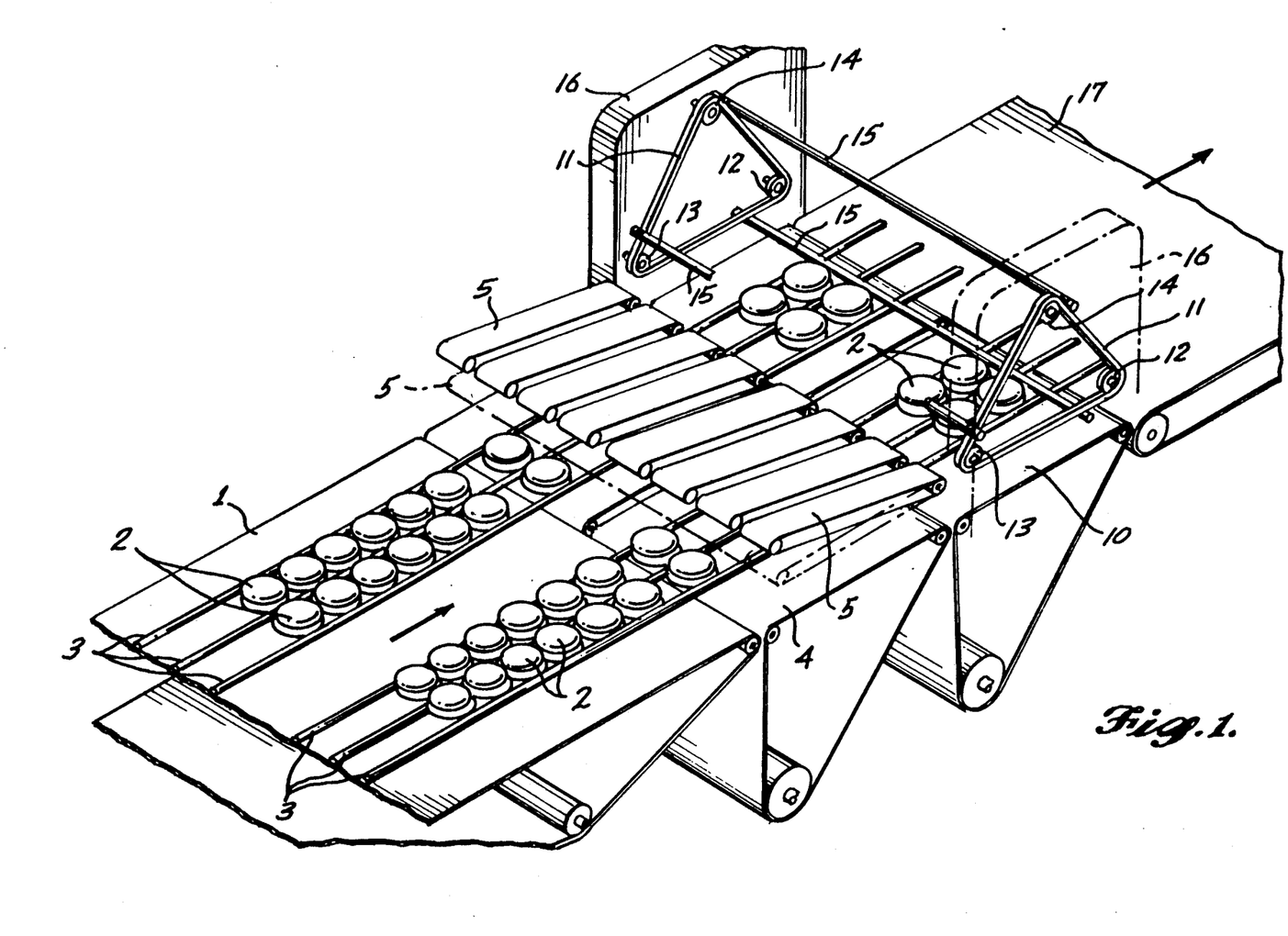
FIG. 1 is a top perspective of article-segregating apparatus according to the present invention.

FIG. 1 shows a belt supply conveyor 1 of a width to transport to the group-segregating apparatus several rows of articles 2 to be segregated into groups, such articles being represented as hamburger buns, for example. Such articles are confined to rows by guide strips 3 extending lengthwise parallel to the direction of movement of the supply conveyor 1 and spaced apart a distance approximately equal to the width of the articles being fed. Alternatively, such guide strips could be ribs formed on the supply conveyor belt 1.

The supply conveyor belt moves the rows of articles to be segregated onto an infeed belt conveyor 4 located below an upper article-holding belt 5. The infeed conveyor 4 is clutch-controlled for intermittent operation. The upper holding belt 5 is mounted on pulleys 6 and 7 and pulley 6 is mounted to swing upward from the position shown in FIGS. 2 and 3 to the position shown in FIGS. 4 and 5 about the axis of pulley 7 to lift the belt out of contact with all the articles behind the leading article. The belt 5 can be driven by driving pulley 7 by a belt 8 which in turn can be driven by a pulley 9 when the belt 5 is in its lower position shown in FIGS. 2 and 3 or in its raised position shown in FIGS. 4 and 5.

The control of infeed conveyor 4 and holding or hold-down belt 5 can be coordinated so that the upper belt 5 is stopped at the same time that infeed belt 4 is stopped to interrupt feed movement of articles between them. The upper belt 5 can be driven simultaneously with the infeed belt 4 when the upper belt is in its lower position shown in FIG. 3. When the upper conveyor is stopped its pulley 6 can be raised to the position shown in FIG. 4 so that the supply conveyor 1 can feed additional articles onto the stopped infeed belt behind the leading article gripped between the end of the stopped upper belt 5 beneath pulley 7, as indicated by the difference in position of the articles shown in FIGS. 4 and 5.

Instead of having the hold-down belt 5, the article on the infeed conveyor 4 nearest the grouping mechanism could be held in place on stopped conveyor 4 by a hold-down pad which would be lowered when such belt is topped to prevent the first article from being slid into the grouping mechanism. When conveyor 4 is started again such hold-down pad would be raised to release the article for movement by conveyor 4.

The infeed conveyor 4 delivers articles to be grouped into the grouping mechanism which, as shown in FIGS. 1 through 5, includes a group-supporting acceleration belt conveyor 10 and upper grouper chains 11 located at opposite sides of the infeed conveyor 4 and mounted in vertical planes by passing them around mounting sprockets 12, 13 and 14. Such grouper chains 11 serve as supports for the opposite ends of article group-blocking flights 15 which bridge between the chains 11. One or more of the sprockets 12, 13 and 14 are driven by a drive mechanism housed within casing 16. Travel of such chains 11 moves such group-blocking flights around an orbit including one leg located parallel to and close above the flat upper stretch of group-supporting belt 10. Such belt moves successive groups of articles onto the outfeed belt 17.

In operation, the supply conveyor 1 moves continuously, but its surface is smooth so that, if movement of articles beyond the supply conveyor is arrested, the supply conveyor will slip beneath the articles but will move them forward whenever resistance to their movement is discontinued or sufficiently reduced.

Figure 2:
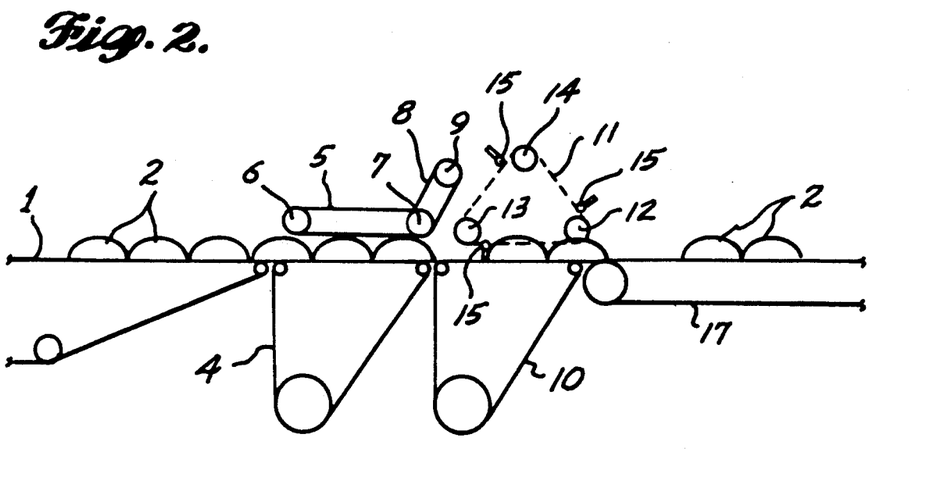
FIG. 2, FIG. 3, FIG. 4 and FIG. 5 are diagrammatic side elevations of the apparatus illustrating its method of operation.
Figure 3:
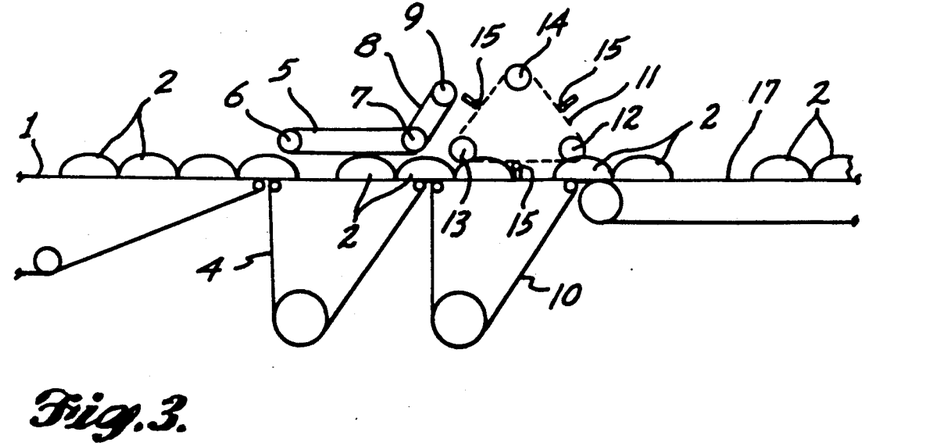
Figure 4:
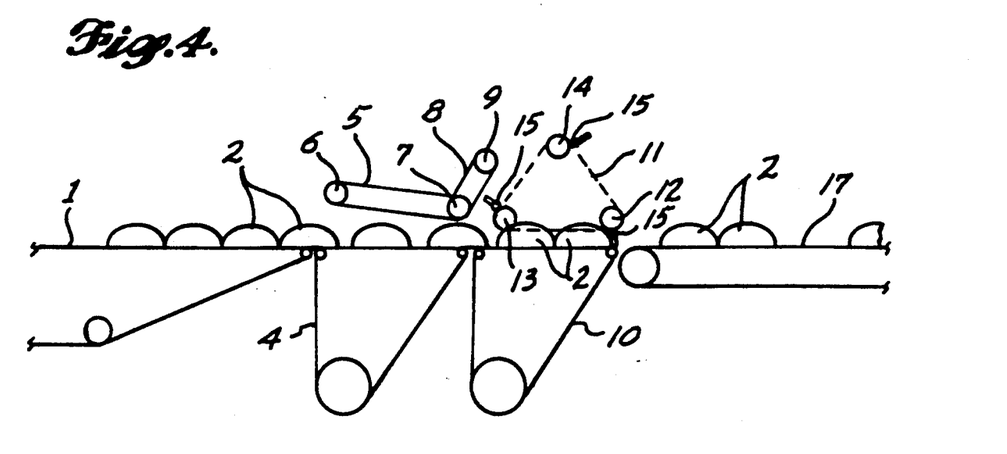

Movement of the articles by the supply conveyor 1 is arrested when the clutch driving the infeed conveyor 4 is disengaged and the upper belt 5 is stopped in its lower position engaging the upper sides of the articles, as shown in FIG. 2. The grouping mechanism belts 10 and chains 11 run continuously In FIG. 2 a grouping pusher rod 15 is being lowered behind a group of articles on the group-supporting belt 10. As soon as the grouping rod has been lowered to its lowest position, the clutch driving the infeed conveyor 4 is engaged and the upper belt 5 is started. The infeed belt 4 and the upper belt 5 cooperatively push the leading articles forward until the most forward article engages a group-blocking flight 15 and the next following article is being crowded against such most forward article, as shown in FIG. 3. Such feed of belts 4 and 5 continues until the next group has been formed, at which time the infeed belt 4 and the upper belt 5 are stopped to arrest movement of the most forward article in the next group while the group-supporting conveyor 10 continues to move the article group formed on that conveyor and to push it against the group-blocking flight 15 ahead of it, as shown in FIG. 4. When the group-blocking flight lifts, as shown in FIG. 5, the group-supporting conveyor 10 moves the article group onto outfeed conveyor 17.

Figure 5:
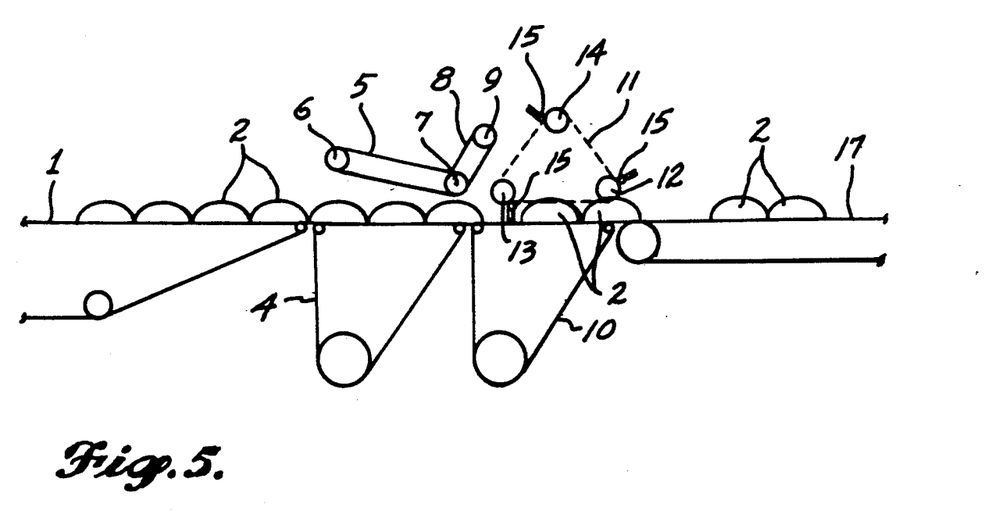

The pulley 6 carrying the end of belt 5 farther from the grouping mechanism can be raised from the lower position shown in FIG. 3 to the upper position shown in FIG. 4 while belt 5 is stopped so that such belt will not impede movement of articles 2 by supply conveyor 1 onto the infeed conveyor 4 and into abutment, as shown in FIG. 5, even though conveyor 4 also is stopped. Almost immediately after such bunching has been completed, the next flight 15 will have been moved downward from the position of FIG. 5 into the lower portion of its orbit shown in FIG. 2, the clutch for driving belt 4 will be reengaged and belt 5 will be started again to move the most forward article on infeed conveyor 4 into engagement with the next group-blocking flight 15, as shown in FIG. 3.

When the next group has been fed onto the group-supporting belt 10, the clutch-driving belt 4 will again be disengaged and belt 5 will be stopped to repeat the operation while belt 10 continues to press the next segregated group against flight 15 ahead of it. Belt 10, which is moving faster than grouper chains 11, will feed the group of articles formed on belt 10 onto outfeed or discharge belt 17. Such outfeed belt runs at the same speed as group-supporting belt 10 or slightly slower so as to preserve the integrity of the article groups moved onto it but the speed of belt 17 will be greater than the speed of grouper chains 11 to enable outfeed belt 17 to provide predetermined spacing between successive groups of articles.

Figure 7:
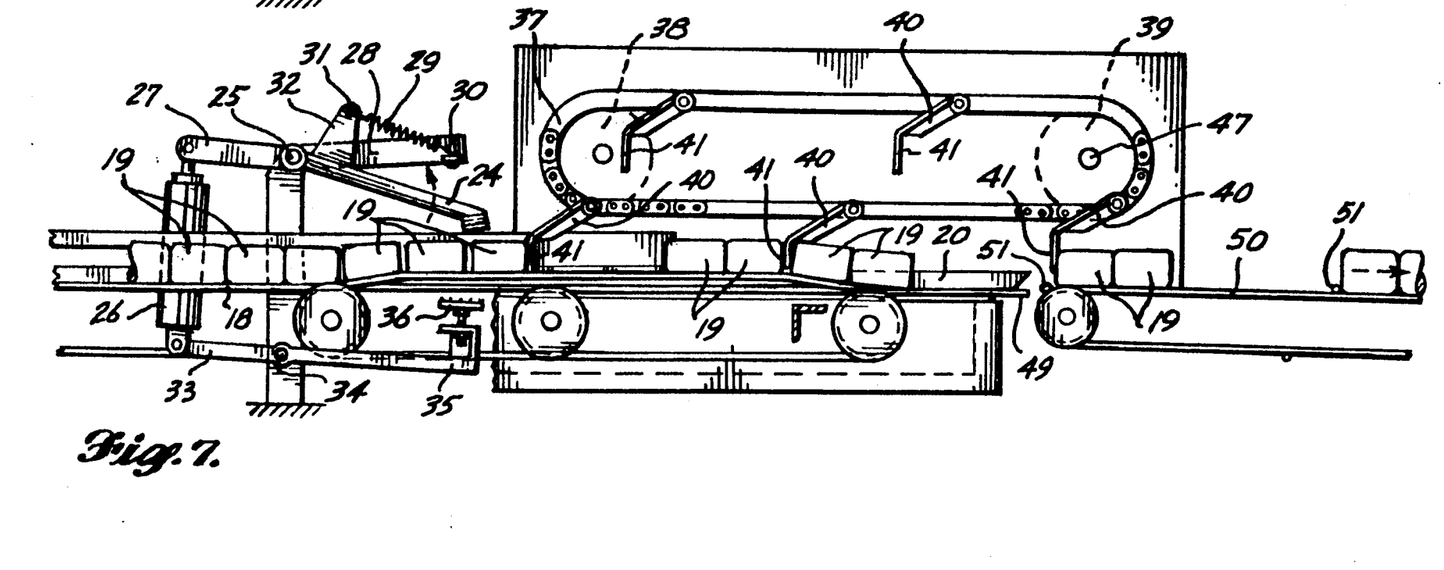
Figure 8:
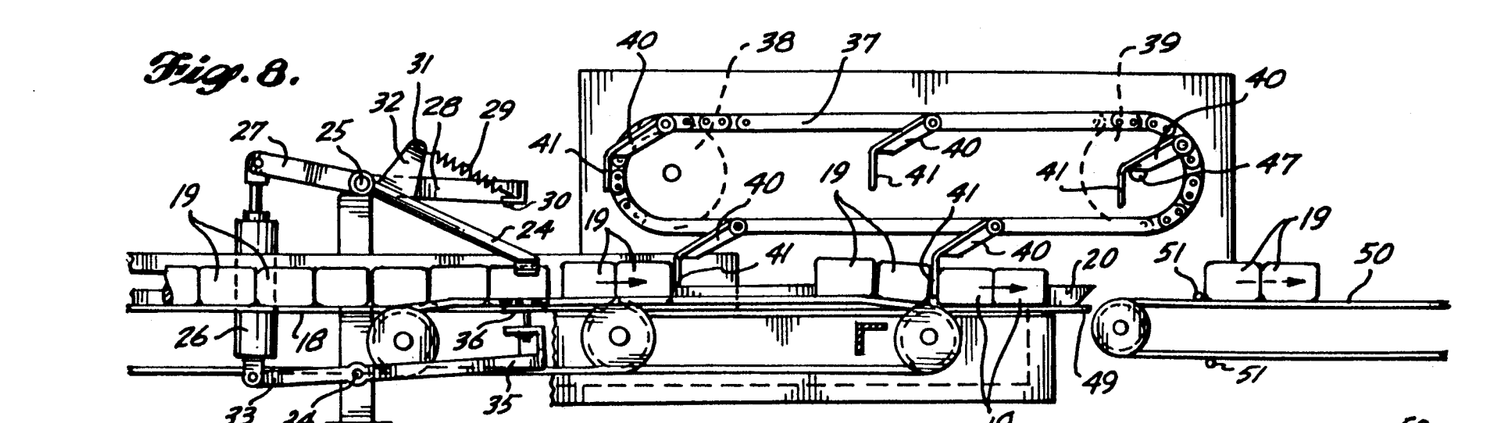
Figure 9:
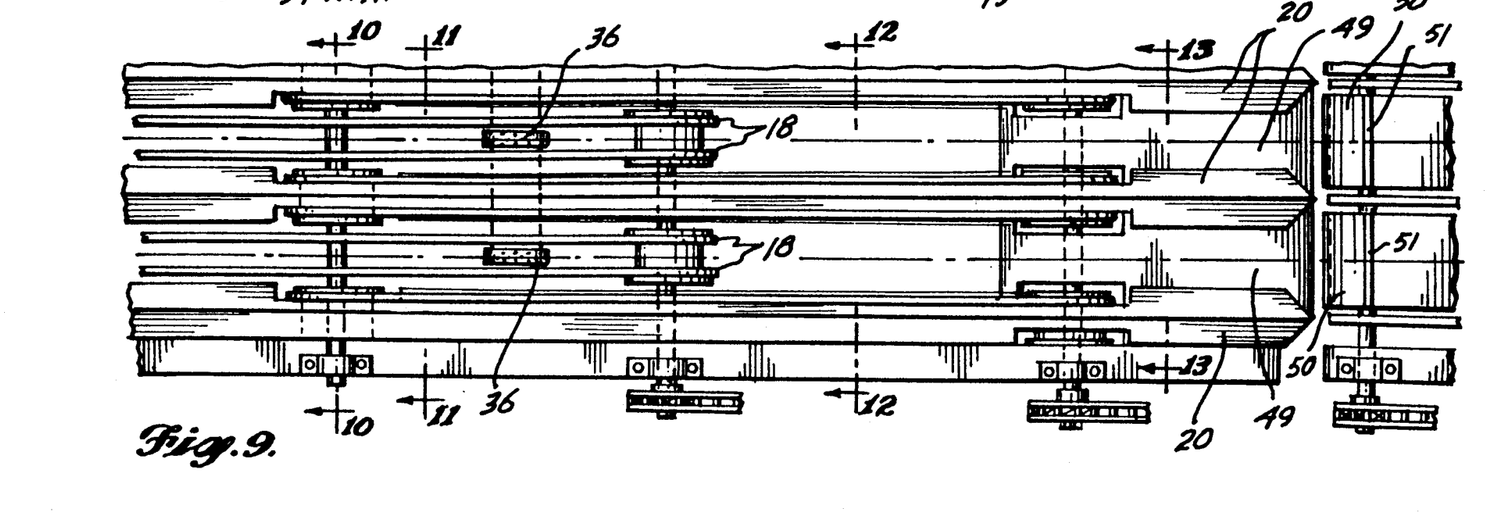
FIG. 9 is a plan of the apparatus shown in FIGS. 6, 7 and 8.
Figure 10:
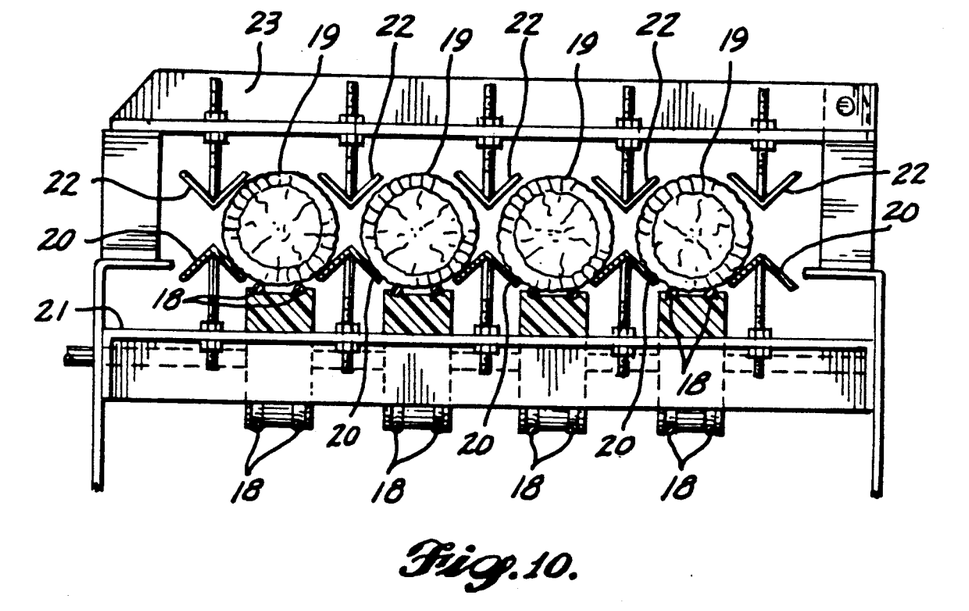
FIG. 10 is a transverse vertical sections through the apparatus taken on line 10—10 of FIG. 9.
Figure 11:
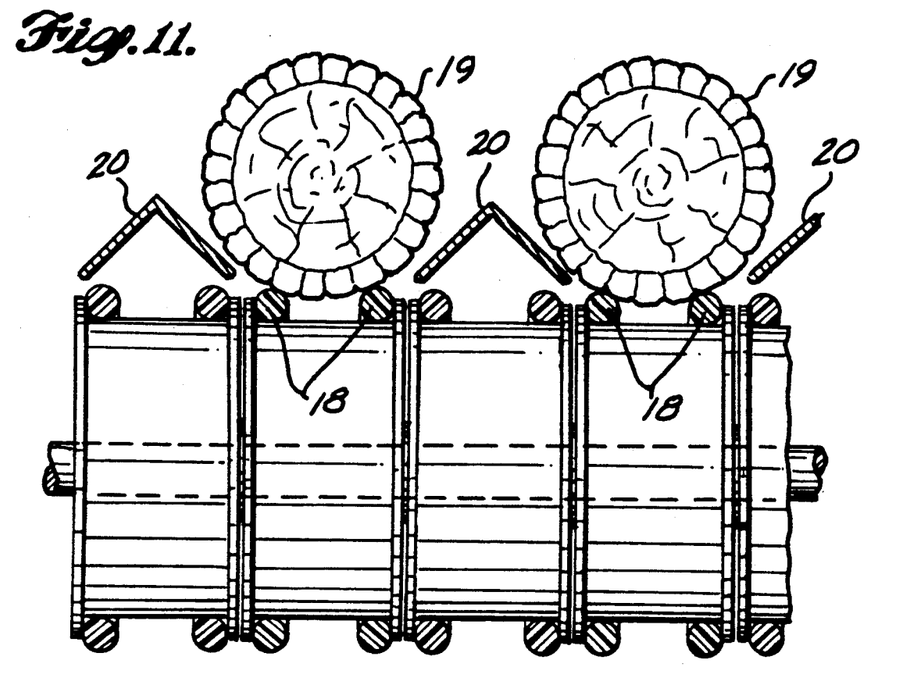
FIGS. 11, 12 and 13 are enlarged fragmentary cross-sectional views taken on line 11—11, 12—12 and 13—13, respectively, of FIG. 9.

The apparatus shown in FIGS. 6 to 15 is generally similar to the apparatus described in connection with FIGS. 1 to 5, but in this instance the articles being segregated into groups are corncob chunks. In order to control their movement by supply conveyors 18 formed by transversely-spaced round belts, guide strips 20 adjustably supported from the machine frame 21 are provided, as shown in FIGS. 9, 10 and 11. Upper holddown strips 22 adjustably supported from an upper frame member 23 are provided to cooperate with the lower guide strips 20.

In this apparatus the supply conveyors run continuously and a clamping mechanism is provided to arrest movement of the articles by such conveyors which is somewhat different from the clamping belts described in connection with FIGS. 1 through 5. A swinging clamp arm 24 is mounted on pivot 25 to be swung by drive means including a pneumatic jack 26. The upper end of such jack is pivotally connected to one end 27 of a lever having a pivot fulcrum coinciding with the pivot 25 of clamp arm 24, as shown best in FIG. 14. The opposite end portion 28 of the lever carries a helical tension spring 29, one end of which is attached to a frame 30 mounted on the arm 28 of the jack-actuated lever. The other end of spring 29 is connected to the end 31 of a horn 32 mounted on the arm 24.

Figure 6:
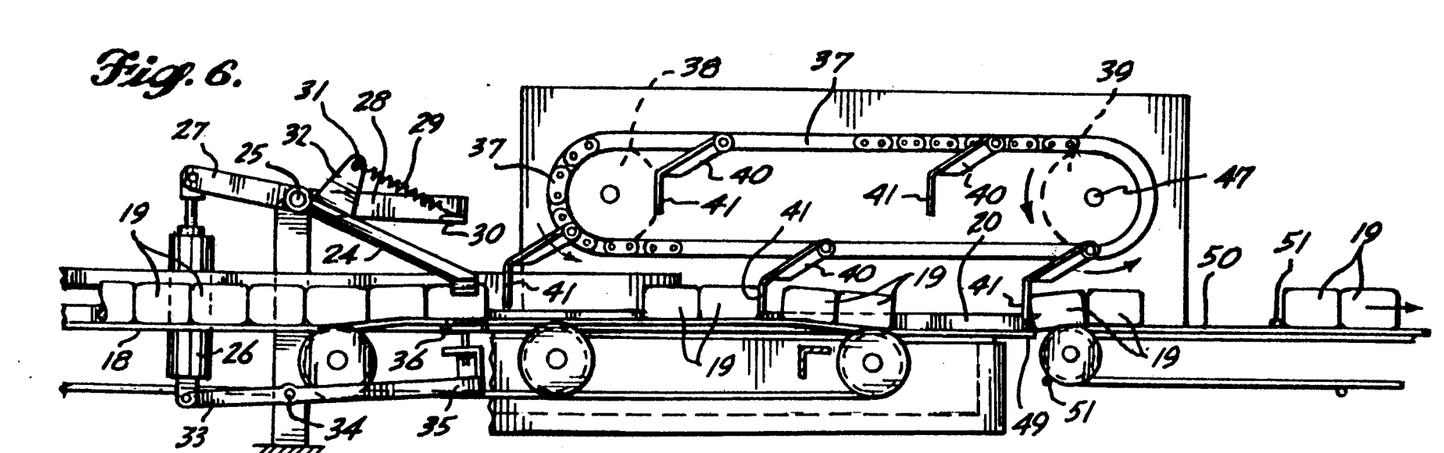
FIG. 6, FIG. 7 and FIG. 8 are somewhat diagrammatic side elevations of a different form of apparatus according to the present invention showing parts in different operating positions.

The arrangement described provides a yielding resilient lost motion connection between the jack 26 and the upper clamp arm 24 because extension of the jack moves the lever arm 27 upward to swing the opposite lever arm 28 downward. Such downward swinging tensions spring 29 which pulls horn 32 forming one arm of a bell crank for the upper clamp arm 24 which functions as the other arm of the bell crank. When the jack 26 is extended and the clamp arm has been swung down to engage its clamp shoe with an article on conveyor 18, as shown in FIG. 6, continued swinging of the lever 27, 28 by the jack 26 will stretch the spring 29 to increase the pressure of the clamp shoe on the article even though engagement of the clamp shoe with the article prevents further movement of the clamp arm.

Jack 26 has a double action in that its lower end is connected to one arm 33 of a lever mounted by a pivot fulcrum 34. The other end 35 of such lever carries a lower clamp shoe 36 engageable with the underside of an article 19. The position of such lower shoe can be adjusted relative to the lever 35 to accommodate articles of different depth without subjecting them to more pressure by the upper clamp shoe than is desired. Such lower clamp shoe preferably acts to lift the article which it engages out of contact by belts 18 and 48.

Figure 15:
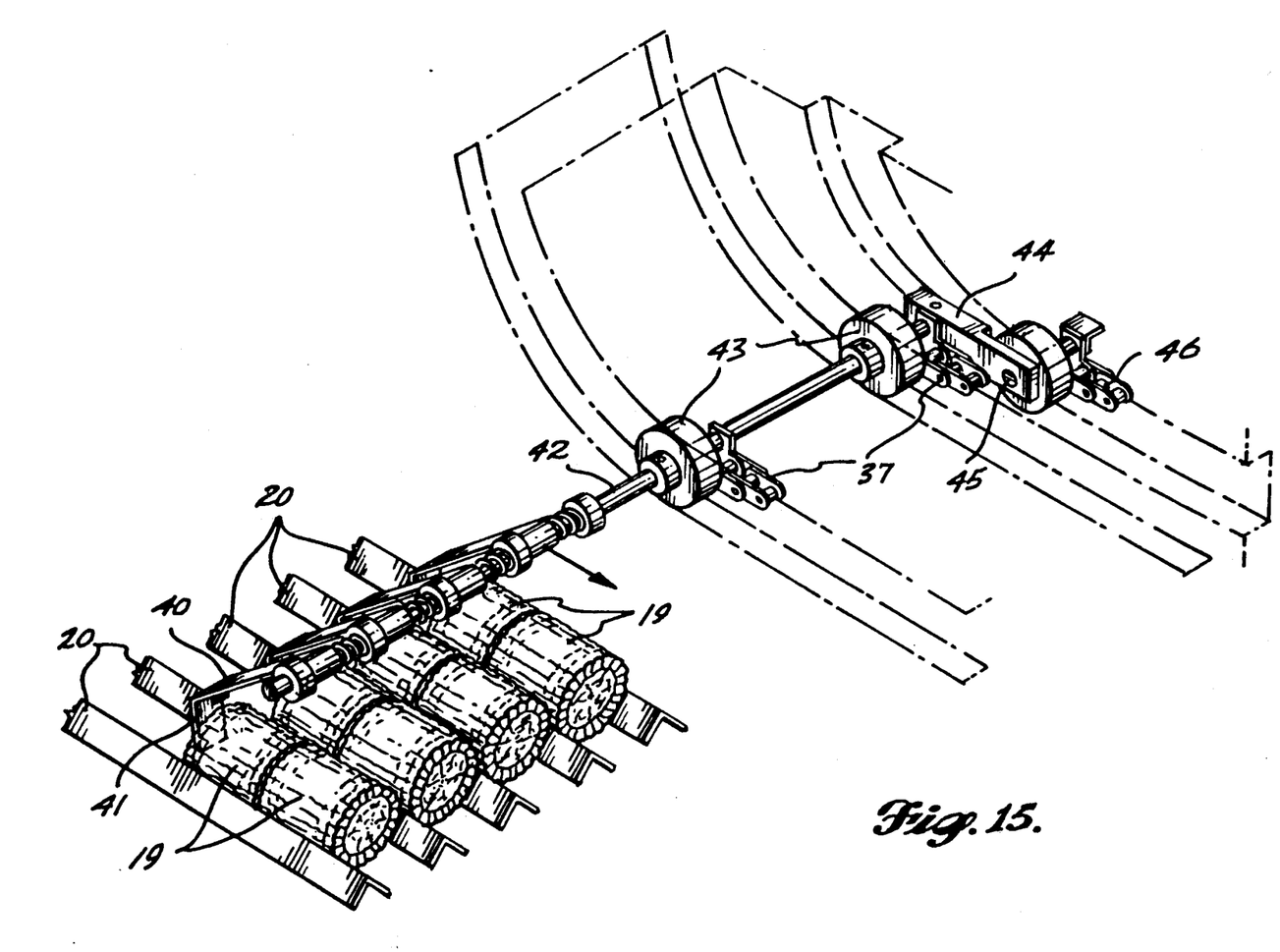
FIG. 15 is a fragmentary top perspective of a portion of the grouping mechanism of the apparatus.

When the jack 26 is contracted to release clamps 24, 36, the conveyors 18 and 48 will feed articles into the grouping mechanism. Such grouping mechanism includes endless grouper chains 37 each extending around a sprocket 38 at one end of its loop and a sprocket 39 at the other end of its loop. Such chains carry flights 40 as shown in FIGS. 6, 7 and 8 having depending article group-blocking and pushing plates 41. As shown in FIG. 15, each row of flights 40 is carried by an axle 42 having bearings 43 carried by chains 37. An arm 44 secured to rod 42 carries a pivot 45 mounted in a bearing attached to a control chain 46. The orbit of such control chain is offset from the orbit of flight-mounting chains 37 sufficiently to control the rotative position of axle 42 to maintain the flights 40 and plates 41 in the same attitude in all positions around the orbit, as shown in FIGS. 6, 7 and 8. The axle 47 mounting sprocket 39 is power-driven in turn to drive grouping chains 37.

Figure 12:
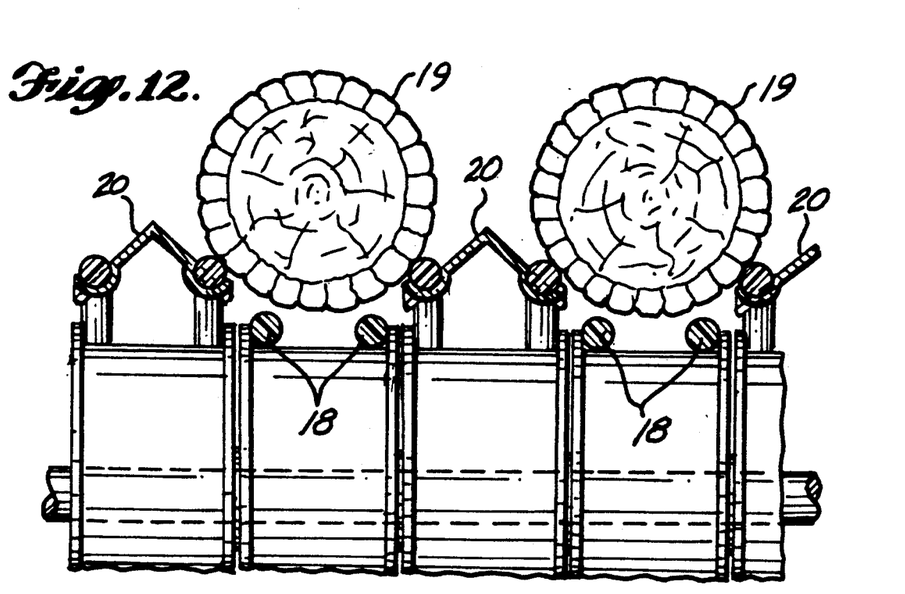
Figure 13:
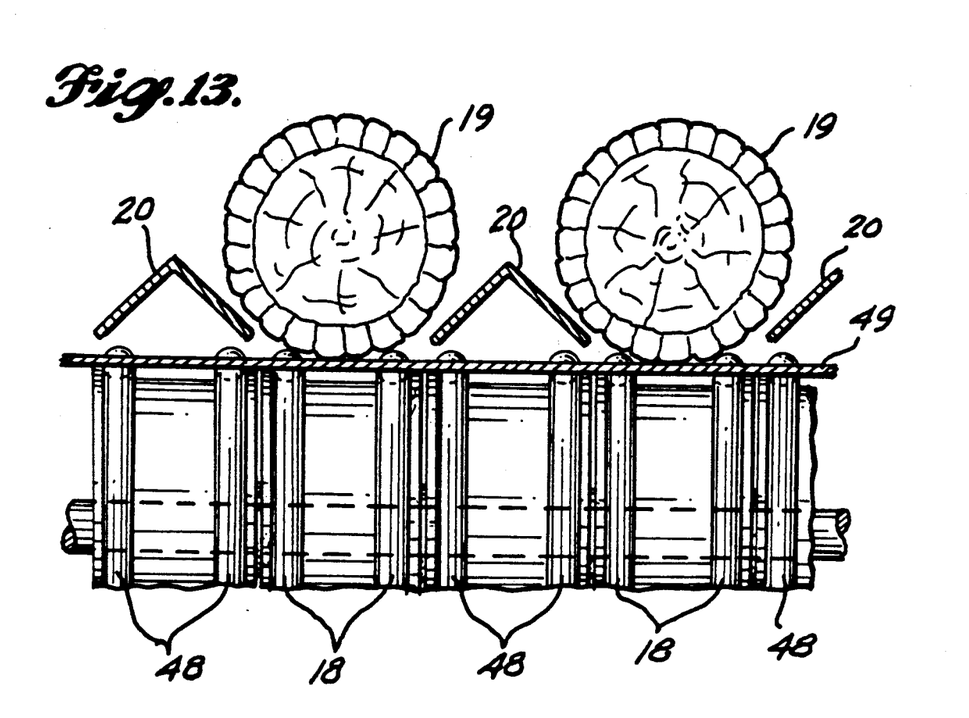
Figure 14:
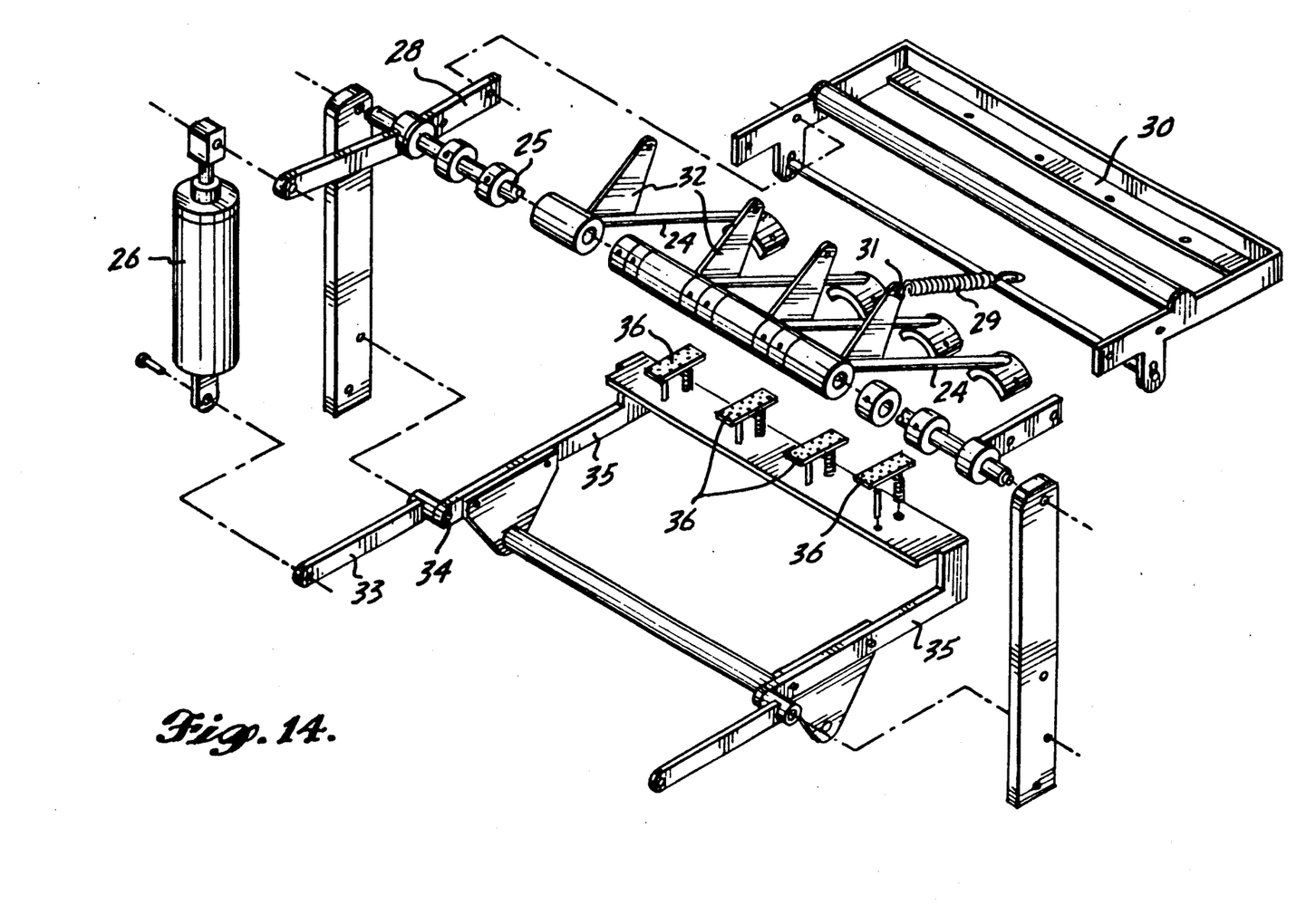
FIG. 14 is an exploded top perspective of clamping mechanism of the apparatus.

Articles moved into the group-segregating mechanism by supply conveyor belts 18 are carried forward from such belts by an acceleration conveyor 48 also composed of transversely spaced round belts as shown in FIG. 12 but the upper stretches of which are located somewhat higher than the upper stretches of the belts of conveyor 18. Such belts move the articles onto a plate 49 over which a group of articles can be moved by the flight plates 41, as shown in FIGS. 7 and 8, until they are slid onto outfeed belt 50 having flights 51 spaced apart sufficiently to accommodate a group of articles between them for discharge from the group-segregating apparatus. Preferably, the flights 51 are spaced apart the same distance as the grouping mechanism flights 40 and the conveyor 50 travels at the same speed as chains 37 or somewhat slower to preserve the integrity of the groups of articles on conveyor 50.

Actuation of the clamping means jack is coordinated with the travel of the grouper flights 40. As shown best in FIG. 7, when the clamping means 24, 36 is opened by contraction of jack 26, the infeed supply conveyor 18, traveling faster than segregating mechanism grouper chains 37, will move the articles so as to press the leading article against the back side of a flight plate 41 which has just reached its lowest position. Such pushing will continue, as shown in FIG. 8, until the leading article of the next group is clamped by clamp means 24, 36 actuated by extension of jack 26. Conveyor 18 and acceleration conveyor 48 will continue to urge the grouped articles against the back side of the flight plate 41 until the group has begun to be moved by conveyor 48 onto the plate 49 ready to be picked up by the next flight plate, as indicated in FIG. 6.

The spacing between the flights 15 shown in FIGS. 1 through 5 and the flight plates 41 shown in FIGS. 6 through 8 may be ample to accommodate even a larger group of articles than shown. Such larger group can be accommodated simply by changing the timing of engaging and disengaging the clutch driving belt 4 in FIGS. 1 through 5 and the driving of the hold-down belt 5, or changing the timing of the operation of jack 26 in FIGS. 6, 7 and 8 to alter the timing of operating the clamp mechanism with reference to the group-segregating flights 15 in FIGS. 1 through 5 or the flight plates 41 in FIGS. 6, 7 and 8.

I claim:

1. In apparatus for segregating groups of articles from a continuous line of such articles including an orbiting flight movable along a substantially horizontal path for controlling movement of a group of articles behind it, article infeed means for moving articles in a row toward such orbiting flight and crowding articles in such row against the back side of such flight to form a group and clamping means for arresting movement of an article rearwardly of such group of articles having opposed jaws engageable with opposite sides of such an article, the improvement comprising drive means for moving the jaws toward each other, lost motion means engaged between said driven means and at least one of the jaws for enabling movement of said drive means to continue after approach movement of the jaws has been stopped by engagement with an article therebetween, and said lost motion means including spring means for pressing such one jaw against the article engaged between the jaws while movement of said drive means is continued after relative approach movement of the jaws has been stopped.

2. In the apparatus defined in claim 1, the lost motion means including a swingable arm carrying one of the clamping means jaws and swingable relative to the drive means, and the spring means is engageable between said swingable arm and the drive means.

3. In the apparatus defined in claim 2, the drive means including a second swingable arm carrying the other clamping means jaw and fluid jack means engaged between the swinging arms and operable selectively to swing the arms oppositely relative to each other to move the jaws carried thereby away from each other or to move such jaws toward each other.

* * * * *